United States Patent
Rheinheimer et al.

(10) Patent No.: US 9,769,012 B2
(45) Date of Patent: *Sep. 19, 2017

(54) NOTIFICATION NORMALIZATION

(71) Applicant: International Business Machines Corporation, Armonk, NY (US)

(72) Inventors: Michael R. Rheinheimer, Cedar Park, TX (US); Brian L. White Eagle, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 13/948,570

(22) Filed: Jul. 23, 2013

(65) Prior Publication Data

US 2015/0026325 A1 Jan. 22, 2015

Related U.S. Application Data

(63) Continuation of application No. 13/945,154, filed on Jul. 18, 2013.

(51) Int. Cl.
*H04L 29/08* (2006.01)
*H04L 29/06* (2006.01)
(Continued)

(52) U.S. Cl.
CPC ......... *H04L 41/0604* (2013.01); *H04L 51/26* (2013.01); *H04W 4/12* (2013.01); *H04L 41/50* (2013.01); *H04L 67/26* (2013.01)

(58) Field of Classification Search
CPC . H04L 41/0604; H04L 41/50; H04L 41/0213; H04L 29/08072; H04L 29/06;
(Continued)

(56) References Cited

U.S. PATENT DOCUMENTS 5,357,510 A 10/1994 Norizuki et al.
5,473,680 A 12/1995 Porter
(Continued)

FOREIGN PATENT DOCUMENTS

CN 102420827 4/2012

OTHER PUBLICATIONS

IP.com, "Intelligent Notification Channel Selector," IP.com No. IPCOM000221942D, Sep. 17, 2012, 3 pages.
(Continued)

*Primary Examiner* — Dhairya A Patel
*Assistant Examiner* — Clifton Houston
(74) *Attorney, Agent, or Firm* — Cantor Colburn LLP; Nicholas Bowman

(57) ABSTRACT

Embodiments relate to notification normalization in a mobile communication environment. A method for notification normalization is provided. The method includes receiving, at a notification service of a mobile platform server executing on a computer processor, a plurality of notification triggers to deliver a plurality of notifications from an application server to a plurality of endpoints. The notification service determines whether to apply notification throttling based on a stress level of the application server, and spreads delivery of the notifications to the endpoints over a period of time based on determining to apply the notification throttling such that traffic associated with responses from the endpoints to the application server is substantially normalized.

5 Claims, 5 Drawing Sheets

(51) Int. Cl.
  *H04L 12/24* (2006.01)
  *G06F 15/16* (2006.01)
  *H04W 4/12* (2009.01)
  *H04L 12/58* (2006.01)

(58) Field of Classification Search
  CPC ......... H04L 41/22; H04L 41/12; H04L 67/26;
    H04L 69/08; H04L 69/18; H04L 67/303;
    H04L 51/26; H04L 67/1095; H04L 67/06;
    H04L 7/0079; H04L 67/42; H04W 4/12;
    G06F 17/30174
  See application file for complete search history.

(56) References Cited

U.S. PATENT DOCUMENTS

| | | |
|---|---|---|
| 6,401,099 B1 | 6/2002 | Koppolu et al. |
| 6,928,051 B2 | 8/2005 | Butt et al. |
| 7,680,035 B2 | 3/2010 | Krishnan |
| 7,685,633 B2 | 3/2010 | Ben-Shachar et al. |
| 7,769,046 B1 | 8/2010 | Crocker |
| 8,023,934 B2 | 9/2011 | Jeide et al. |
| 8,107,406 B2 | 1/2012 | Huang et al. |
| 8,144,586 B2 | 3/2012 | McNaughton et al. |
| 8,219,067 B1* | 7/2012 | Haldar ............ H04M 1/72547 455/412.1 |
| 8,279,878 B2 | 10/2012 | Takashige et al. |
| 2003/0037335 A1 | 2/2003 | Gatto et al. |
| 2005/0226430 A1 | 10/2005 | Kreifeldt et al. |
| 2005/0261923 A1 | 11/2005 | Brown et al. |
| 2006/0286993 A1* | 12/2006 | Xie ................ H04W 76/005 455/518 |
| 2007/0022198 A1 | 1/2007 | Messer et al. |
| 2007/0106739 A1 | 5/2007 | Clark |
| 2008/0005188 A1 | 1/2008 | Li et al. |
| 2009/0204681 A1* | 8/2009 | Sun ................ H04L 12/587 709/206 |
| 2009/0247134 A1 | 10/2009 | Jeide et al. |
| 2010/0073160 A1* | 3/2010 | Gilmour et al. ............ 340/540 |
| 2010/0241760 A1 | 9/2010 | Zhang et al. |
| 2010/0257451 A1 | 10/2010 | Halevi et al. |
| 2010/0268767 A1 | 10/2010 | McColgan et al. |
| 2011/0040895 A1 | 2/2011 | Griffin et al. |
| 2011/0060996 A1 | 3/2011 | Alberth, Jr. et al. |
| 2011/0078318 A1* | 3/2011 | Desai ................ G06F 9/5083 709/228 |
| 2011/0169632 A1* | 7/2011 | Walker et al. ............ 340/539.13 |
| 2011/0173681 A1* | 7/2011 | Qureshi ............. H04L 63/0823 726/4 |
| 2011/0264778 A1* | 10/2011 | McGregor ............ G06F 9/5016 709/223 |
| 2012/0071178 A1 | 3/2012 | Sun et al. |
| 2012/0173610 A1 | 7/2012 | Bleau et al. |
| 2012/0179767 A1* | 7/2012 | Clarke et al. ................ 709/206 |
| 2012/0198268 A1 | 8/2012 | Qureshi et al. |
| 2012/0259918 A1 | 10/2012 | Bringer et al. |
| 2013/0013560 A1 | 1/2013 | Goldberg et al. |
| 2013/0013804 A1 | 1/2013 | Traynor |
| 2013/0054706 A1* | 2/2013 | Graham ................ H04M 19/04 709/206 |
| 2013/0268480 A1 | 10/2013 | Dorman |
| 2013/0332522 A1* | 12/2013 | Tang ........................ G06F 8/65 709/204 |
| 2013/0332538 A1 | 12/2013 | Clark et al. |
| 2013/0346521 A1* | 12/2013 | Arabo ............... H04L 29/08693 709/206 |
| 2014/0201289 A1 | 7/2014 | Wheeler et al. |
| 2014/0337464 A1 | 11/2014 | McGarva et al. |
| 2014/0364103 A1 | 12/2014 | Marti et al. |
| 2015/0019654 A1* | 1/2015 | Wheeler ................. H04L 51/24 709/206 |
| 2015/0024793 A1* | 1/2015 | Kaplinger ............... H04L 69/18 455/466 |
| 2015/0024794 A1* | 1/2015 | Kaplinger ......... G06F 17/30174 455/466 |
| 2015/0026237 A1* | 1/2015 | Kaplinger ......... G06F 17/30174 709/203 |
| 2015/0026324 A1 | 1/2015 | Rheinheimer et al. |
| 2015/0026325 A1 | 1/2015 | Rheinheimer et al. |
| 2015/0026356 A1* | 1/2015 | Kaplinger ............... H04L 69/18 709/230 |

OTHER PUBLICATIONS

Mahesh Sooriyabandara et. al., Unified Link Layer API: A generic and open API to manage wireless media access, Computer Communications, v 31, n 5, p. 962-979, Mar. 25, 2008, Elsevier.

* cited by examiner

NOTIFICATION NORMALIZATION

CROSS-REFERENCE TO RELATED APPLICATIONS

This application is a continuation of U.S. patent application Ser. No. 13/945,154, filed Jul. 18, 2013, entitled "NOTIFICATION NORMALIZATION," which is hereby incorporated by reference in its entirety.

BACKGROUND

The present disclosure relates to communication interfaces and, more specifically, to notification traffic normalization in a mobile communication environment.

The prevalence of mobile smart devices has driven many changes in the way clients and servers communicate. Some of the changes include new client/server application models and new types of notification mechanisms. Push notification forwards notifications from application servers to mobile devices. Notifications can include various types of data, audio, or text alerts. In contrast, pull technology is based on requests initiated by mobile devices. Push notification can improve battery life of mobile devices as compared to greater power consumption of background processes typically running to support pull technology.

To support push notification, mobile devices can include logic running outside of the client. The logic may trigger some action on the client via a notification. When a notification is received on the client, the specified action may require the client to connect to an application server to retrieve data or take further action on the awaiting information. A variety of platform-specific push notification transport protocols have been developed, including Apple™ Push Notification Service (APNs), Google™ Cloud Messaging (GCM), Short Message Service (SMS), and other proprietary protocols.

As the number of mobile devices accessing web content and/or applications increases, the burden on application servers and communications networks also increases. State changes or events can result in a large number of notifications being sent simultaneously. This results in many mobile devices simultaneously connecting to an application server that initiated the notifications, which can cause dramatic spikes in web traffic from the mobile devices.

SUMMARY

According to an embodiment, a method for notification normalization is provided. The method includes receiving, at a notification service of a mobile platform server executing on a computer processor, a plurality of notification triggers to deliver a plurality of notifications from an application server to a plurality of endpoints. The notification service determines whether to apply notification throttling based on a stress level of the application server, and spreads delivery of the notifications to the endpoints over a period of time based on determining to apply the notification throttling such that traffic associated with responses from the endpoints to the application server is substantially normalized.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
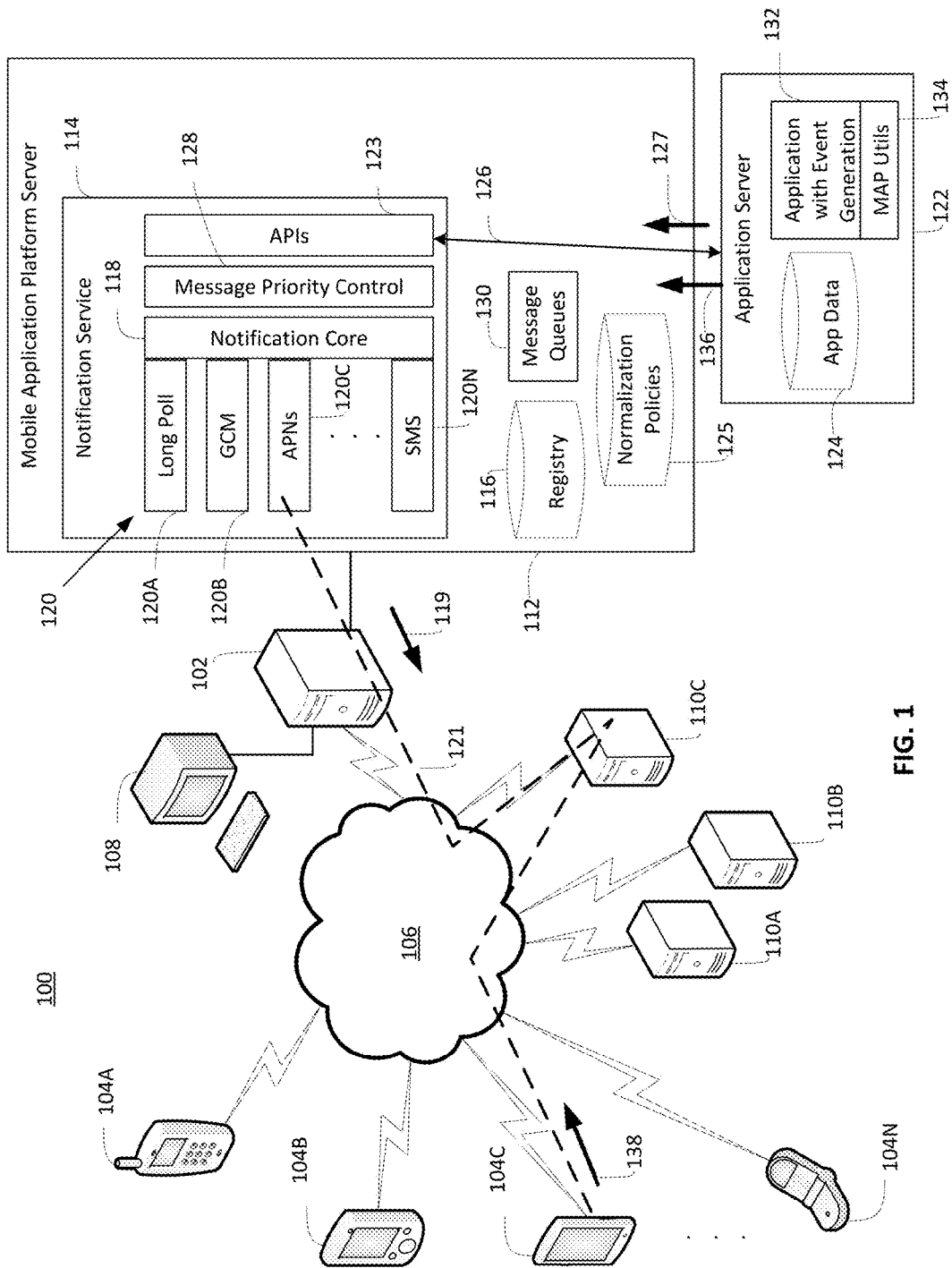
FIG. 1 depicts a block diagram of a system upon which notification normalization may be implemented according to an embodiment.

Exemplary embodiments relate to notification traffic normalization using push notification middleware in a mobile communication environment. The push notification middleware provides a notification framework that is dynamic and supports notification channels and endpoints. Notification channels may be defined to support a variety of notification transport protocols. Endpoints are targeted recipients of push notifications. The push notification middleware is pluggable to support multiple notification transport protocols which can be modified over time. The push notification middleware is optimized for a mobile communication environment, where notification delivery is not guaranteed and expected to have low latency. In exemplary embodiments, an application programming interface (API) is exposed by the push notification middleware for simple message delivery, where a notification transport protocol and target device (s) need not be known by the API caller. The API for simple message delivery is extensible and therefore capable of receiving additional metadata to support modifications and additions to the notification transport protocols.

The push notification middleware may provide push notification based on triggers. Exemplary embodiments support loose coupling of triggering and delivery, where a notification channel for push notification delivery need not be known by a triggering entity. Loose coupling simplifies the API for triggering. For example, a trigger may only identify an application and a user. The pluggable framework enables support for new notification channels to be added over time with no changes to a trigger API. Loose coupling may reduce changes needed within the push notification middleware and isolates changes to the plugins. The push notification middleware may also include one or more APIs to optionally add advanced interfaces. APIs of the push notification middleware can be defined at a high level such that additional functions can use the same APIs that external applications use. Common APIs for internal and external interfacing with the push notification middleware can result in more reliable and better tested APIs, as well as freedom to provide software that is "fit for function".

To reduce traffic spikes and the associated burden on an application server initiating a large number of notification triggers at about the same time, exemplary embodiments provide notification throttling to normalize traffic associated with notifications. By normalizing notifications using push notification middleware, the application server need not track precisely how and when notifications are sent to endpoints. The push notification middleware spreads delivery of the notifications to the endpoints over a period of time such that traffic associated with responses from the endpoints to the application server is substantially normalized. The push notification middleware can perform normalization where the notifications target a variety of endpoints using multiple notification transport protocols.

Turning now to FIG. 1, an example of a system 100 upon which notification normalization may be implemented will now be described in greater detail. The system 100 represents a mobile communication environment. In the example depicted in FIG. 1, the system 100 includes a server system 102 configured to communicate with one or more mobile devices 104A-N over a communication network 106. In exemplary embodiments, the server system 102 is a high-speed processing device (e.g., a mainframe computer, a desktop computer, a laptop computer, a hand-held device, an embedded computing device, or the like) including at least one processing circuit (e.g., a computer processor/CPU) capable of reading and executing instructions, and handling interactions with various components of the system 100.

In exemplary embodiments, the mobile devices 104A-N, each generally referred to as a mobile device 104, can include a variety of mobile handsets and mobile computing devices with processing circuits and I/O interfaces, such as a keys/buttons, a touchscreen, audio input, a display device and audio output. In the example depicted in FIG. 1, the mobile devices 104A-N support push notification using a variety of notification transport protocols. The server system 102 and mobile devices 104A-N can include various computer/communication hardware and software technology known in the art, such as one or more processing units or circuits, volatile and non-volatile memory including removable media, power supplies, network interfaces, support circuitry, operating systems, and the like. The server system 102 may also include one or more user interfaces 108 with user accessible I/O devices, such as a keyboard, mouse, and display.

The communication network 106 may be any type of communications network known in the art. The communication network 106 can include a combination of wireless, wired, and/or fiber optic links. The communication network 106 may support a variety of known communication standards that allow data to be transmitted wirelessly between the server system 102 and the mobile devices 104A-N. Additional computer systems, such as gateways 110A, 110B, and 110C, may also interface with the server system 102 and the mobile devices 104A-N via the communication network 106 or other networks. The gateways 110A-110C may provide protocol conversion and implementation-specific support as needed between the server system 102 and one or more of the mobile devices 104A-N.

In exemplary embodiments, the server system 102 includes a mobile application platform server 112, which is an example of push notification middleware. The mobile application platform server 112 includes a notification service 114 and a registry 116. The notification service 114 includes a notification core 118 that interfaces with a plurality of channel plugins 120. The notification core 118 is pluggable to support multiple notification transport protocols as defined via the channel plugins 120. Each of the channel plugins 120 may support a particular notification transport protocol. In the example of FIG. 1, channel plugin 120A is a customized notification transport protocol referred to as Long Poll. Channel plugin 120B supports Google™ Cloud Messaging (GCM), channel plugin 120C supports Apple™ Push Notification Service (APNs), and channel plugin 120N supports Short Message Service (SMS). Each of the channel plugins 120 can be used to establish channels for push notification to the mobile devices 104A-N. In some cases, various gateways 110A-C are used to establish notification channels with the mobile devices 104A-N. For example, gateway 110A may be a GCM gateway, gateway 110B may be an SMS server, and gateway 110C may be an APNs gateway. It will be understood that additional or fewer gateways 110 and channel plugins 120 can be supported in embodiments. An example of a notification channel 121 is depicted in FIG. 1 that is established between channel plugin 120C associated with the APNs notification transport protocol to send a notification 119 between the notification service 114, gateway 110C, and mobile device 104C in this example.

In the example of FIG. 1, the Long Poll notification transport protocol of channel plugin 120A enables push notification on mobile devices 104A-N that may not otherwise have an existing notification transport protocol defined, e.g., legacy mobile devices. The Long Poll notification transport protocol and other notification transport protocols may support direct push notification to mobile devices 104A-N rather than involving one of the gateways 110A-C.

In exemplary embodiments, the notification service 114 uses the registry 116 to track relationships between applications, users, and the mobile devices 104A-N for push notification. The registry 116 can also coordinate which notification transport protocol and channel plugin 120 is associated with a particular endpoint. An endpoint, or notification endpoint, can be defined at a device level, e.g., one of the mobile devices 104A-N, or at an application level, such as a particular application instance executing on one of the mobile devices 104A-N. Accordingly, each of the mobile devices 104A-N can have more than one endpoint defined in the registry 116.

The mobile application platform server 112 may also include normalization policies 125 for push notification normalization. The notification service 114 can be configured to throttle notifications based on the normalization policies 125. The normalization policies 125 may define a delivery limit to a number of endpoints per time interval, where the delivery limit can be associated with an application server, such as application server 122, and applied across a plurality of notification channels 121. The normalization policies 125 can be modified by an administrator of the mobile application platform server 112 to establish priorities and rules for normalization.

Figure 3:
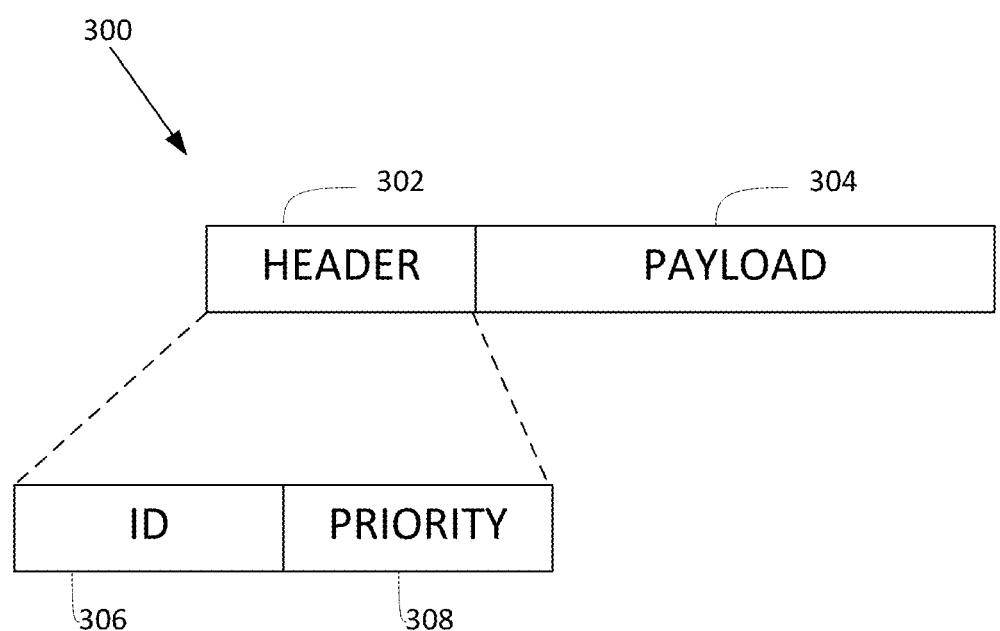
FIG. 3 depicts an example of a notification trigger format according to an embodiment.

The notification service 114 supports calls to notification service APIs 123 from application servers, such as the application server 122, to trigger notifications which are mapped through the registry 116 to one or more endpoints and sent as push notifications. The application server 122 may define a notification trigger 127 that includes a payload of data (as depicted in FIG. 3) based on application data 124 to be sent through the mobile application platform server 112 to an endpoint, such as one or more of the mobile devices 104A-N. A communication path 126 enables the application server 122 to trigger notifications via API calls to the notification service 114. The application server 122 can include one or more applications 132 with event generation that result in the notification trigger 127. Event generation can include urgent and non-urgent distribution of information and application updates for the mobile devices 104A-N.

The application server 122 may also include utilities such as a mobile application platform utility 134 configured to determine a current stress level 136 of the application server 122 and provide the current stress level 136 to the notification service 114. The current stress level 136 may represent a percentage of processing resources currently being used by the application server 122 and/or a percentage of bandwidth currently being utilized on the communication path 126. Accordingly, the mobile application platform utility 134 acts as a sensor to determine when the application server 122 is being stressed and would likely benefit from notification normalization.

The mobile application platform server 112 may also include a message priority control 128. In exemplary embodiments, when the notification service 114 receives a plurality of notification triggers 127 to deliver a plurality of notifications 119 from the application server 122 to a plurality of endpoints on the mobile devices 104A-N, the message priority control 128 determines whether to apply notification throttling based on a stress level of the application server 122. The message priority control 128 spreads delivery of the notifications 119 to the endpoints on the mobile devices 104A-N over a period of time based on the determination to apply the notification throttling such that traffic associated with responses 138 from the endpoints to the application server 122 is substantially normalized. The message priority control 128 may access normalization policies 125 to determine conditions for applying notification throttling. In addition to a delivery limit as previously described, the normalization policies 125 may also establish threshold levels of the current stress level 136 and/or an anticipated stress level of the application server 122. As previously described, the current stress level 136 may be received from the mobile application platform utility 134 of the application server 122. The message priority control 128 may be configured to determine the anticipated stress level based on a number of endpoints associated with the notification triggers 127 and a threshold associated with the application server 122.

In exemplary embodiments, the message priority control 128 interfaces with message queues 130. When the message priority control 128 determines that notification throttling should be applied, the message priority control 128 can inspect the notification triggers 127 as they are received to identify priority values. For notification triggers 127 that have a priority indicating non-urgent notification, the non-urgent notifications are temporarily stored in the message queues 130 to delay delivery of the non-urgent notifications. As stress levels are reduced, the non-urgent notifications are read from the message queues 130 and sent as notifications 119 to the endpoints on the mobile devices 104A-N on the notification channels 121. Spreading the notifications 119 over a period of time, where the notifications 119 are associated with a large number of notification triggers 127 received as about the same time, results in the response 138 from the endpoints on the mobile devices 104A-N being spread over time to reduce response traffic based stress on the application server 122. The mobile application platform server 112 therefore offloads traffic management concerns of the application server 122 related to multiple notification transport protocols and timing of the notification triggers 127 and the responses 138.

Figure 2:
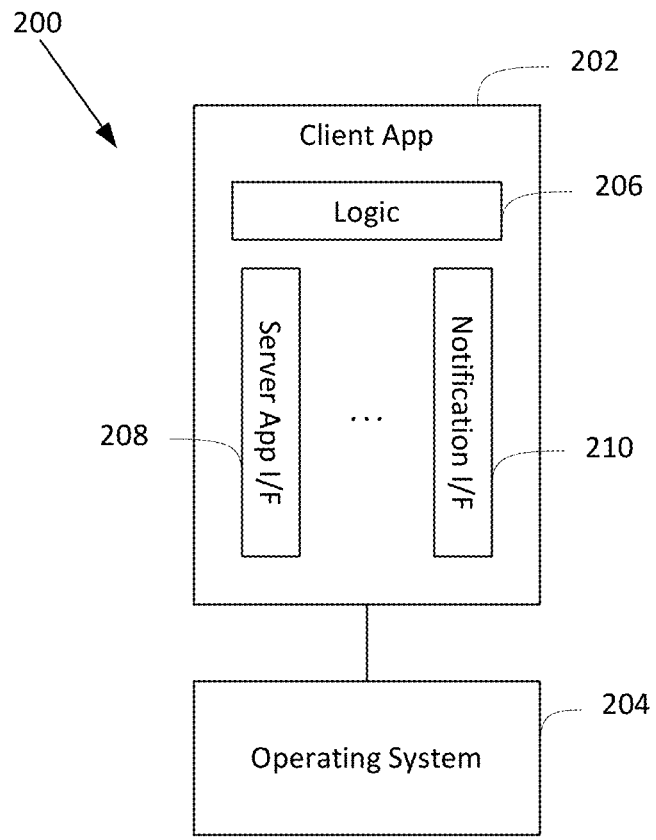
FIG. 2 depicts an example client device for notification normalization according to an embodiment.

FIG. 2 depicts an example of a client device 200 for push notification and notification normalization according to an embodiment. The client device 200 is an example of one of the mobile devices 104A-N of FIG. 1. The client device 200 includes a client application 202 that interfaces to an operating system 204. The client application 202 includes logic 206 that interacts with a number of modules, such as a server application interface 208 and a notification interface 210. The notification interface 210 is configured to identify and react to notifications from the notification service 114 of FIG. 1. The server application interface 208 is configured to utilize content in the payload data sent by the application server 122 of FIG. 1 as part of a notification 119 of FIG. 1. The notification interface 210 interprets particular notification transport protocols over channels established through the channel plugins 120 of FIG. 1. For example, if the device 200 is an Apple™ device, the operating system 204 may be an iOS™ operating system, and the notification interface 210 can be an APNs interface that is compatible with the APNs channel plugin 120C of FIG. 1. Alternatively, if the device 200 is an Android™ device, the operating system 204 may be an Android™ operating system, and the notification interface 210 can be a GCM interface that is compatible with the GCM channel plugin 120B of FIG. 1.

FIG. 3 depicts an example of a notification trigger format 300 according to an embodiment that can be applied to the notification trigger 127 of FIG. 1. In the embodiment of FIG. 3, the notification trigger format 300 includes a header 302 and a payload 304. The header 302 includes an identifier 306 and a priority 308. The identifier 306 may be a channel-application-user ID tuple (CAUple) that can include a combination of a channel unique identifier (ChUID), an application identifier (App ID), and a user identifier (User ID). A ChUID uniquely identifies an endpoint for a specific channel, such as a device identifier. For example, where the notification transport protocol is Long Poll, the ChUID is the device identifier. The ChUID for an SMS channel may be a phone number of the endpoint. To support loose coupling, a specific value for the ChUID may be omitted or defined as a wildcard such that a triggering entity need not know specific device details and instead relies upon a lookup by the notification service 114 into the registry 116 for channel endpoints. The priority 308 distinguishes urgent and non-urgent notifications, where non-urgent notifications can be subject to notification throttling by the notification service 114 of FIG. 1. The payload 304 is the content to be delivered to an endpoint, which may be a short text string. Notification triggers 127 of FIG. 1 according to the notification trigger format 300 may be sent on the communication path 126 of FIG. 1.

Figure 4:
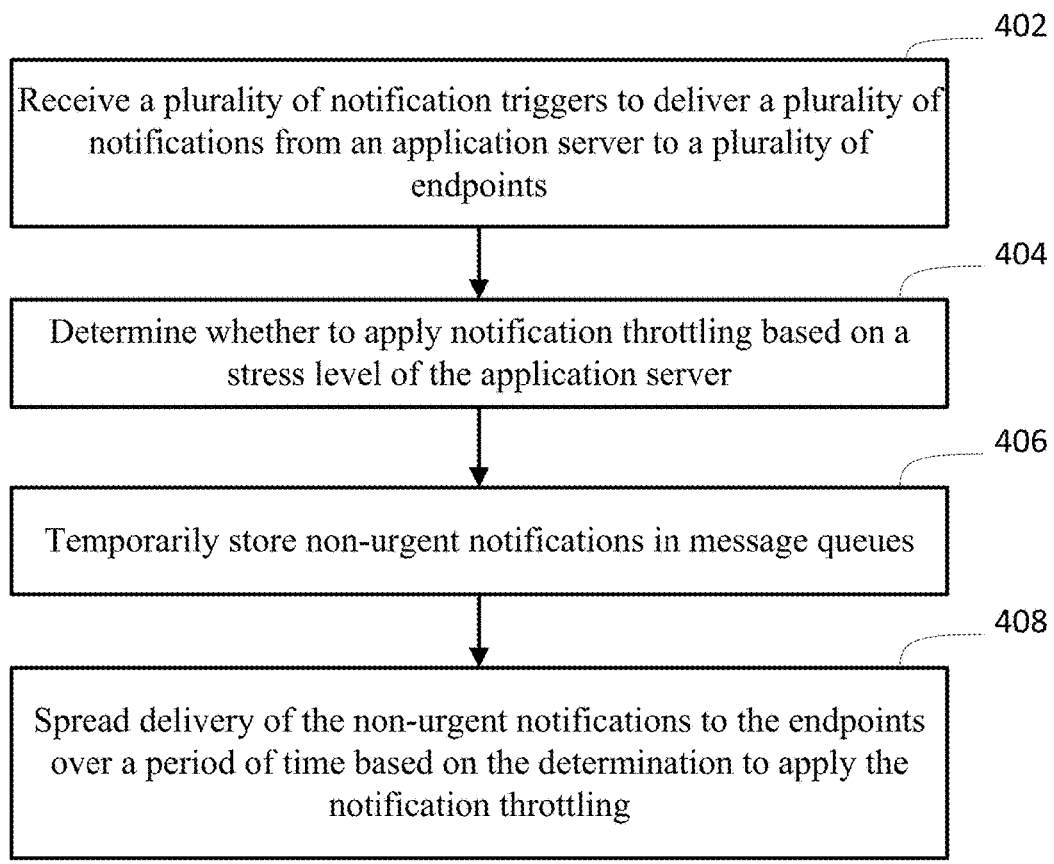
FIG. 4 depicts a flow diagram of a process for notification normalization according to an embodiment.

Turning now to FIG. 4, a process 400 for notification normalization will be described in accordance with an exemplary embodiment. The process 400 is described in reference to FIGS. 1-4 and can be implemented by the server system 102 of FIG. 1.

At block 402, the notification service 114 receives a plurality of notification triggers 127 to deliver a plurality of notifications 119 from an application server 122 to a plurality of endpoints. Each of the endpoints may be a device or application instance on one of the mobile devices 104A-N. The notification triggers 127 may be received through notification service APIs 123 of the notification service 114 and formatted according to the notification trigger format 300, including a payload 304 and a header 302 with an identifier 306 and a priority 308. The identifier 306 may identify an endpoint using a tuple, such as a CAUple with a channel unique identifier, an application identifier, and a user identifier. The notification service 114 can access the registry 116 to determine a channel unique identifier if a specific value is omitted.

At block 404, the notification service 114 determines whether to apply notification throttling based on a stress level of the application server 122. The stress level may include one or more of a current stress level and an anticipated stress level. The current stress level 136 can be received from the mobile application platform utility 134 indicating a stress level detected at the application server 122, such as a percentage of processing resources currently being utilized and/or a percentage of bandwidth of the communication path 126 currently being utilized. The anticipated stress level may be based on a number of endpoints associated with the notification triggers 127 and a threshold associated with the application server 122. The stress level may also or additionally be determined by comparison to the normalization policies 125 that can define a delivery limit to a number of endpoints per time interval. The delivery limit may be associated with the application server 122 and applied across a plurality of notification channels 121.

At block 406, the notification service 114 temporarily stores non-urgent notifications in the message queues 130. The message queues 130 can be used to delay delivery of the non-urgent notifications when notification throttling is active. As previously described, each of the notification triggers 127 may include a priority 308 that indicates whether it is an urgent or non-urgent notification.

At block 408, the notification service 114 spreads delivery of the notifications 119 to the endpoints over a period of time based on the determination to apply the notification throttling such that traffic associated with responses 138 from the endpoints to the application server 122 is substantially normalized. The notification service 114 can spread delivery of the notifications 119 by reading non-urgent notification from the message queues 130, applying the normalization policies 125, and sending the notifications 119 on the notification channels 121.

The registry 116 may be accessed to determine one or more notification transport protocols associated with the endpoints. A channel plugin 120 is selected associated with each of the one or more notification transport protocols to establish a notification channel with each of the endpoints, such as notification channel 121. The notification service 114 includes the notification core 118 that is configured to interface with a plurality of channel plugins 120 associated a plurality of notification transport protocols from which a particular channel plugin is selected. The notification channel 121 may be established between the notification service 114 and the endpoint through a gateway, such as one of the gateways 110A-110C. Each of the notifications 119 is sent on the notification channel 121 of each of the endpoints. The notification service 114 may determine the endpoints and the one or more notification transport protocols associated with the endpoints based on an identifier, such as identifier 304, in each of the notification triggers 127.

Figure 5:
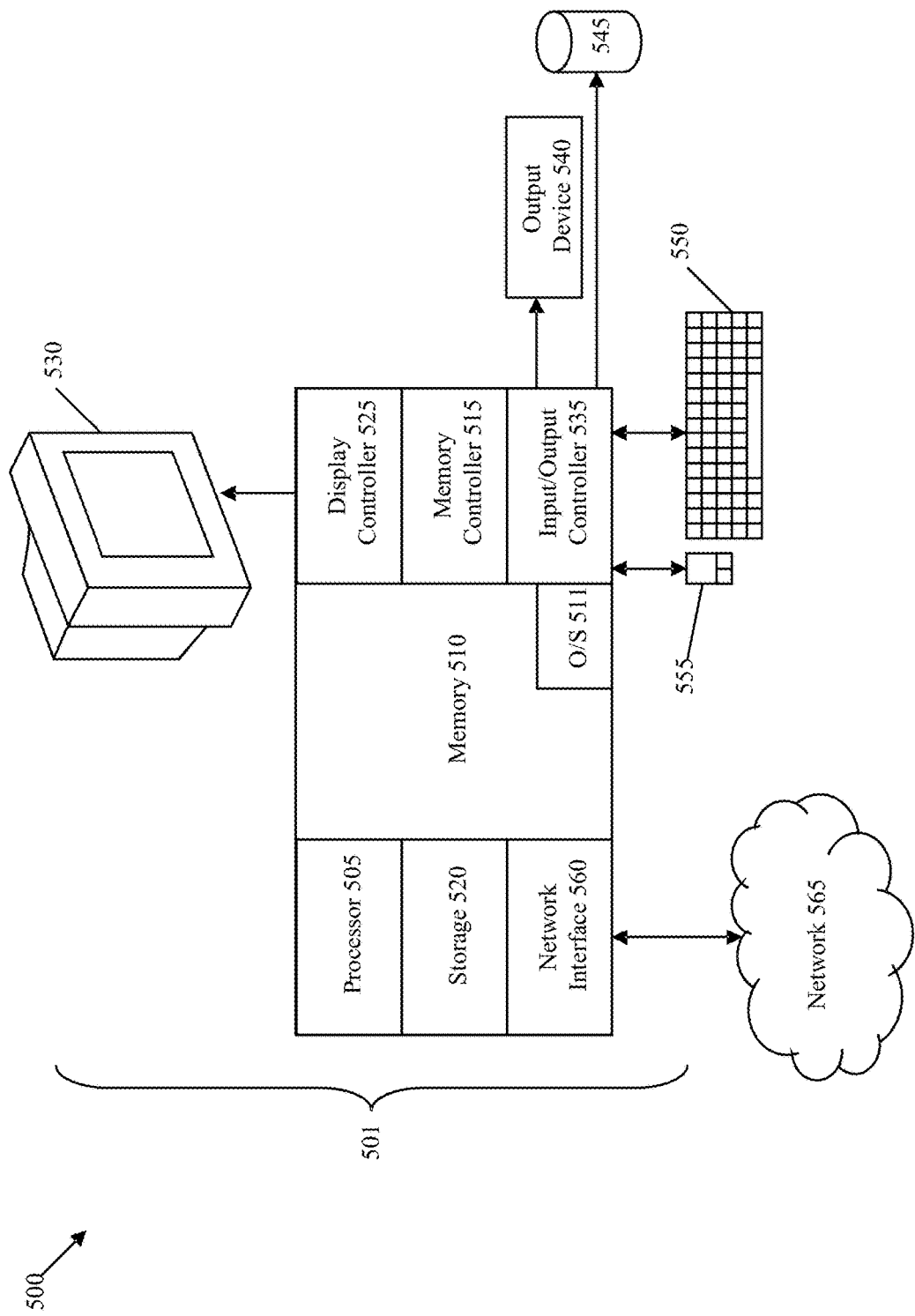
FIG. 5 depicts a further example of a block diagram of a system for notification normalization.

FIG. 5 illustrates a block diagram of a system 500 for notification normalization. The processes as previously described can be implemented in system 500 in hardware, software (e.g., firmware), or a combination thereof as part of a special or general-purpose digital computer, such as a personal computer, workstation, minicomputer, or mainframe computer. The system 500 therefore includes general-purpose computer 501 as illustrated in FIG. 5. The system 500 is a further example of the system 100 of FIG. 1, where the general-purpose computer 501 is an embodiment of the server system 102 of FIG. 1.

In an exemplary embodiment, in terms of hardware architecture, as shown in FIG. 5, the computer 501 includes a computer processor 505 and memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 505 is a processing device for executing software, particularly software stored in storage 520, such as cache storage, or memory 510. The computer processor 505 can be any custom made or commercially available computer processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the computer processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the computer processor 505 is configured to execute instructions stored within the memory 510, to communicate data to and from the memory 510, and to generally control operations of the computer 501 pursuant to the instructions.

Technical effects include providing push notification middleware to map push notifications through channel plugins and normalize response traffic to notifications for an application server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method, comprising:
   receiving, at a notification service of a mobile platform server executing on a computer processor, a plurality of notification triggers to deliver a plurality of notifications from an application server to a plurality of endpoints;
   identifying a plurality of non-urgent notifications based on a priority defined in a header of each of the notification triggers;
   determining, by the notification service, to apply notification throttling based on a stress level of the application server, wherein the stress level is indicative of a percentage of processing resources being used by the application server and the stress level comprises a current stress level detected at an application server and an anticipated stress level based on a number of endpoints associated with the plurality of notification triggers and a threshold associated with the application server;
   determining to temporarily store the non-urgent notifications in a one of a plurality of message queues based on identifying the non-urgent notifications and the stress level of the application server;
   in response to determining to apply notification throttling, spreading delivery, by the notification service, of the notifications to the endpoints over a period of time by reading the non-urgent notifications from the one of the plurality of message queues, applying normalization policies, and sending the notifications to the end points including delaying the sending of the non-urgent notifications until the stress level of the application server is reduced;
   accessing a registry to determine one or more notification transport protocols associated with the endpoints;
   selecting a channel plugin associated with each of the one or more notification transport protocols to establish a notification channel with each of the endpoints;
   sending each of the notifications on the notification channel of each of the endpoints; and
   determining the endpoints and the one or more notification transport protocols associated with the endpoints based on an identifier in each of the notification triggers.

2. The method of claim 1, wherein the normalization policies define a delivery limit to a number of endpoints per time interval.

3. The method of claim 2, wherein the delivery limit is associated with the application server and applied across a plurality of notification channels.

4. The method of claim 1, further comprising: receiving the current stress level from a mobile application platform utility of the application server.

5. The method of claim 1, further comprising: identifying a plurality of urgent notifications, wherein the sending the notifications to the end points further includes continuing the sending of the urgent notifications before the stress level of the application server is reduced.

* * * * *